United States Patent Office 2,903,981
Patented Sept. 15, 1959

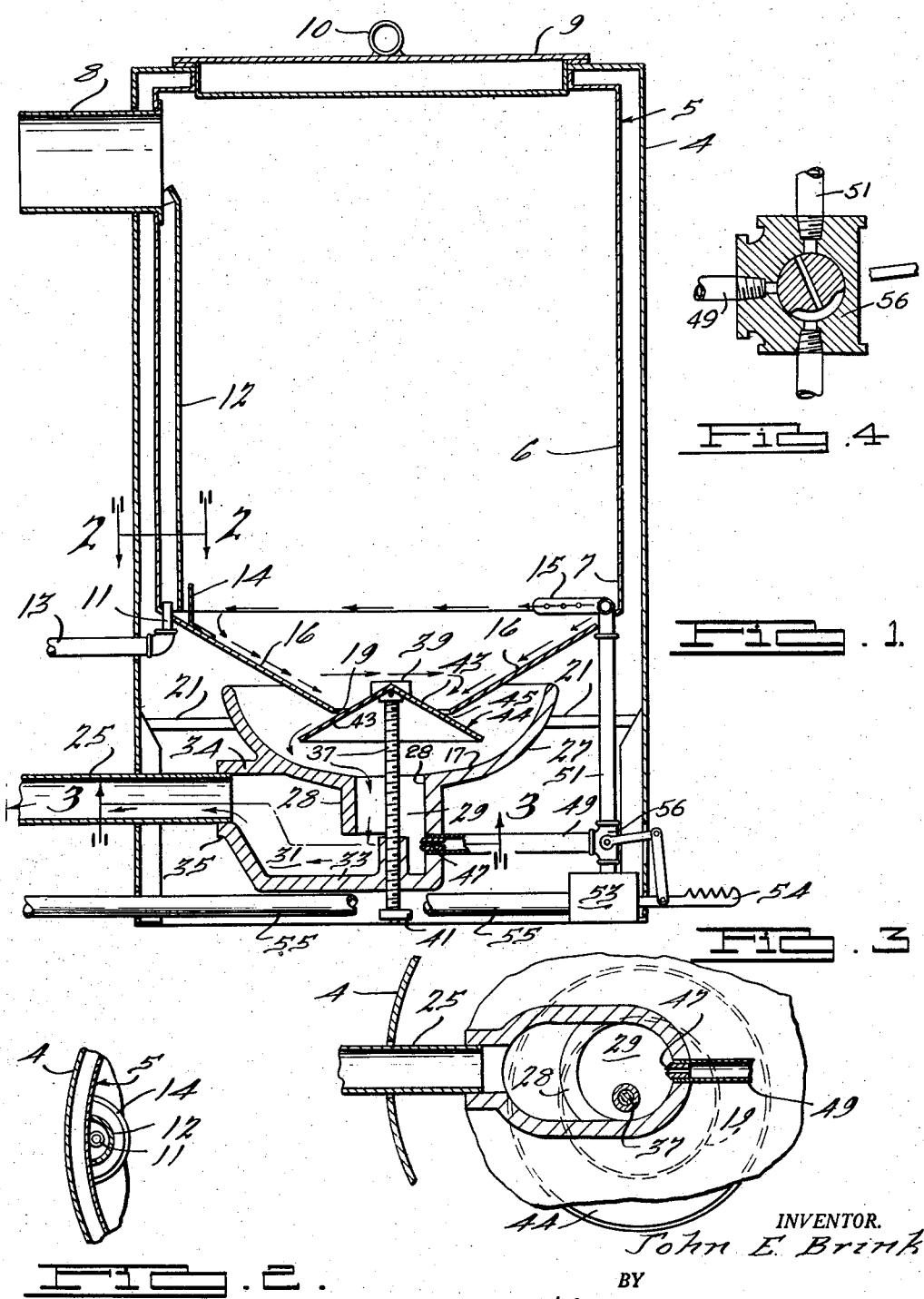

2,903,981

ASH PRODUCING FURNACES AND ASH REMOVAL APPARATUS FOR USE THEREWITH

John E. Brink, Grosse Pointe, Mich.

Application November 14, 1955, Serial No. 546,501

8 Claims. (Cl. 110—165)

This invention relates to improvements in ash producing furnaces and to ash removal apparatus for use therewith and, more particularly, to ash producing furnaces of the incinerator type.

Conventional ash producing furnaces require ash shakers and ash chambers and many times removable ash drawers. Ash shakers are inconvenient because they throw ash into the room where the furnace or incinerator is located in the form of a fine dust which settles throughout the room. Ash chambers are dirty and require frequent cleaning. In incinerator type of ash producing furnaces, removable ash drawers are provided which are inconvenient to handle, annoying and untidy. Oftentimes in this type ash producing furnace, unless the ashes are shaken down and removed, the incinerator will not function properly because the ash that has continually accumulated blocks the inlet of air necessary for combustion. Many times refuse is left in the incinerator with the thought that it will burn, but the next time when more refuse is to be burned, the refuse previously left in has not ignited. This necessitates stopping to shake the ashes down, emptying the ash removal drawer and waiting for the original refuse to burn. These disadvantages curtail the convenience of conventional incinerators.

It is, therefore, an important object of the present invention to provide an incinerator which is self-cleaning, i.e. which incorporates within itself means to rid itself of substantially all ash formed therein.

It is another object of the present invention to provide an incinerator wherein the ashes are completely removed therefrom without entering the room where the incinerator is located.

It is another important object of the present invention to provide an incinerator which does not require frequent clean-out and which is not inconvenient to operate.

It is an important object of the present invention to provide an incinerator in which there is no accumulation of ashes which would block off the inlet of air to the incinerator.

It is still another important object of the present invention to provide ash removal apparatus for use in conjunction with ash producing furnaces which does not require ash shakers, removable ash drawers or ash chambers.

It is another object of the present invention to provide ash removal apparatus which removes the ashes to the exterior of the ash producing furnaces in a quiet and efficient manner without requiring the ash to go to the room in which the ash producing furnace is located.

It is another object of the present invention to provide ash removal apparatus for use in conjunction with ash producing furnaces which does not require constant maintenance and has decreased possibility of failure of parts.

It is another important object of the present invention to provide ash removal apparatus which may be used in conjunction with conventional sewage systems.

Other objects and advantages of the invention will be apparent during the course of the following description, taken in conjunction with the attached drawings, wherein:

Figure 1 is a sectional side elevation of a novel incinerator according to the present invention employing the novel ash removal apparatus of the present invention;

Fig. 2 is a sectional view taken on the line 2—2 of Fig. 1;

Fig. 3 is a sectional view taken on the line 3—3 of Fig. 1; looking in the direction of the arrows with parts removed for the purposes of clairity; and Fig. 4 is a sectional view of a two-way valve of Fig. 1.

In the figures, an outer casing 4 encloses a combustion chamber 5 which can be made in two sections, an upper or combustion section 6 and a lower or ash repository section 7, or it can be made in one piece as shown in the drawings.

The lower ash repository section and associated parts can be manufactured separately for incorporation in any ash producing furnace to form an efficient ash removal system. The ash repository section may be incorporated in an ash producing furnace below the grates, for example, to collect the ash therefrom to remove it to the exterior of the furnace in a quiet, effective manner. If desirable, mechanical means may be provided to automatically remove clinkers falling to the bottom of the ash repository which are too large to pass through the annular passageway formed at the bottom of the ash repository section, thus insuring free passage for the ash size as adjusted and intended to be freely passed by means to be described.

Communicating with the combustion chamber 5 is a flue pipe 8. Cover member 9 seals the combustion chamber from the room wherein the incinerator is located. Cover member 9 may be hinged or it may be separate from casing 4. In any event, it is preferable to have a handle 10 on the cover member to conveniently provide access to the combustion chamber. Within the combustion chamber 5 is a heater element 11. Heater element 11 may be either an electrical heating element or a burner supplied by either gas or oil as fuel. In the latter event, it is preferable that the burner have a stack 12 surrounding it as shown in more detail in Fig. 2 to carry off the gases of combustion directly to the flue. Stack 12 also helps to isolate the heater element from a source of hydraulic flushing means which will be described hereinafter. The line supplying gas or oil to the heater element or electrical conduit in the event that the heater is an electrical heater, is designated generally at 13. Diverter plate 14, shown in detail in Fig. 2, serves to isolate the heater element from the lower section of the combustion chamber where the hydraulic flushing means flows water around the lower part of the combustion chamber, all of which will be described in detail hereinafter. Thus, diverter plate 14 prevents accidental contact of water with the heater element. Within combustion chamber 5 is a spray nozzle 15 which preferably extends for any convenient length circumferentially around the lower part of the combustion chamber (it is apparent that the spray nozzle may take other forms and may, if desirable, be disposed outside the combustion chamber so long as it can flush water thereinto) and is designed to send a spray of water across the lower part of the combustion chamber and down the inclined walls 16 of the bottom of the combustion chamber which in the instance shown is a frusto-conical bottom but it may be of any other shape, such as frusto-pyramidal, for example. The bottom edges 19 of the inclined walls of the combustion chamber define an opening and disposed below the opening is an ash receiver 17.

Ash receiver 17 is supported by a plurality of straps 21 arranged circumferentially around the ash receiver and also by sewer pipe 25 which drains to a conventional sewage system. Ash receiver 17 is substantially bowl-shaped having inclined walls 27 which extend upward of the opening formed by the bottom edges of the combustion chamber and connect with vertical walls 28 to form a vertical flow duct 29 through which the mixture of ashes and water are free to pass. Ash receiver 17 also has a trap section 31 formed by bottom wall section 33, top wall section 34 and vertical wall section 28. The section of vertical wall 28 which partly defines trap section 31 extends down below the uppermost part 35 of the bottom wall section 33 in order to form a liquid seal chamber to isolate the sewer system from the interior of the ash receiver 17. Threadedly engaged through the base of ash receiver 17 is a stud member 37 having a bottom handle 41 for adjusting the height of the stud member within the ash receiver 17. Associated with the stud member 37 is a baffle member 44 having inclined walls 43 which intersect inclined walls 16 on the combustion chamber 5 to define an annular passageway 45 which controls the size of ash that can pass through annular passageway 45 from combustion chamber 5 to ash receiver 17. Baffle member 44 is detachably secured to stud member 37 through handles 39 thereon and handle 41 is likewise detachably secured to stud member 37 so that each of the separate parts can be taken apart and removed individually in the event that the annular passageway becomes clogged. The fact that stud member 37 is adjustable vertically by handles 41 and 39 serves to regulate the size of the annular passageway through which the ash can pass. Regulation of the size of ash which can pass from the combustion chamber to the ash receiver is advantageous in that only fine ash can be allowed to pass, leaving the coarser ash along with unburned refuse to be more completely incinerated. Or it may be expedient in certain instances to pass the coarser ash along with some unburned refuse, making the operation of the incinerator more economical in that a lower degree of burn-up is demanded. In the latter case, the annular passageway 45 would be made larger by adjustment of either handle 39 or 41. Also, in certain domestic incinerators where bottle caps, glass and other foreign objects which do not burn are thrown into the combustion chamber, these can be prevented from passing into the ash receiver and possibly clogging up the operation of the ash removal apparatus. If desirable, mechanical means (not shown) may be employed in conjunction with hydraulic means to remove the material that is too large in respect to the ash size for the annular passageway as adjusted.

Disposed within ash receiver 17 is an ejection nozzle 47. The location of the ejection nozzle within ash receiver 17 is shown in more detail in Fig. 3. Ejection nozzle 47 of course may be disposed with respect to ash receiver 17 in some other fashion and in certain instances outside ash receiver 17, if desired, so long as it can send a forceful jet of water into ash receiver 17 to expel the ash therefrom. Ejection nozzle 47 is preferably directly in line with sewer pipe 25 so that the full force of water leaving the ejection nozzle operates as a jet to direct the flow of ashes out of the sewer system without any hindrance in its path. Stud member 37 is offset in a horizontal direction from the centerline of the axis of the ejection nozzle and the sewer pipe 25. Piping 49 and 51 connect ejection nozzle 47 and spray nozzle 15 to a valve 53.

The valve 53 in turn communicates with a source of water (not shown) by piping 55. Valve 53 has an actuator 54 shown as a foot lever associated therewith. Valve 53 may have the characteristics of a time delay valve; that is, after foot lever 54 is depressed it continues to supply water to ejection nozzle 47 and spray nozzle 15 a number of seconds after release of foot lever 54. This may be accomplished either by mechanical means or by electrical means which are well known to the art. A valve 53 may also be disposed at the junction of the pipes 51 and 49 shown as including a T-section 56 and this valve 53 could function as a two-way valve to supply water to spray nozzle 15 for a sufficient length of time after actuation of foot lever 54 and after spray nozzle 15 has had a supply of water valve 53 could continue to supply water to ejection nozzle 47 for an additional predetermined time after the water supply to nozzle 15 has been cut off. It is apparent that, if desired, valve 53 may operate as a conventional valve supplying water to spray nozzle 15 and ejection nozzle 47 only so long as foot lever 54 is retained in a depressed condition.

The term "ash" according to this invention, and as used in the appended claims, is intended to mean that product from the combustion of any material whether inorganic or organic which is ordinarily insoluble in water. While the term "ash" usually means that portion of the product of combustion which is insoluble in water, it might well be that some of the products formed during combustion are soluble in water and of course the term is used to include such products. It is intended to include completely burned refuse, such as the elemental form to which inorganic material is reduced and the elemental material to which organic material is reduced; for example, carbon. The term also includes partly burned refuse which remains after combustion and for some reason escapes complete decomposition. The term also includes non-burnable materials which are not destroyed at the temperature ordinarily employed in ash-producing furnaces.

The term "furnace" according to the present invention, and as used in the appended claims, is used generically to include all forms of chambers wherein combustion takes place and embraces, for example, burners, incinerators, gasinators, etc. The present invention is especially adapted to furnaces of the ash producing type wherein an appreciable part of the fuel used in the furnace reduces to a nonvolatile product called ash. However, it is apparent that the present invention, if desired, could be used in the construction of, or use with furnaces which are not of the ash producing type because in such instances products of incomplete combustion deposit within the interior of the furnace and oftentimes must be removed in order to present good heat transfer surfaces.

The term "incinerator" according to the present invention, and as used in the appended claims, is a specific type of furnace to which this invention is pre-eminently applicable and is distinguished from furnaces in general in that a smaller amount of fuel is burned for the purpose of driving out water from refuse in order to conveniently dispose of the same. In contrast thereto, most furnaces use a goodly amount of fuel primarily for producing heat, either for heating as such, or for the production of power. Most furnaces are not primarily concerned with providing a convenient means for disposing of refuse.

In the operation of the incinerator of the present invention the top door 9 is raised from the casing of the incinerator and refuse is placed into the body of the combustion chamber 5. The heater element 11 in the case of a burner supplied by either gas or oil is continually burning as a pilot burner and in the event an electrical heater is employed an interlock may be arranged on the door of the incinerator to start the heating element only after refuse is placed in the incinerator. This provision, of course, would be expedient in the event electrical energy is expensive in the location in which use of the incinerator is contemplated. In any event, the heat from the heater 11 in the combustion chamber 5 passes heat by convection from the immediate vicinity of the heater element and also by conduction from stack member 12 which obviously becomes heated during the operation of the heater element and also by radiation from the heater element 11, and stack member 12, and also from the walls of the combustion chamber 5 immediately in the vicinity of the heater. The heat that passes to the refuse either by conduction, convection or radiation gradually dries out the refuse driving off any moisture contained therein. After the refuse has its moisture completely driven out, its temperature is gradually raised to its kindling temperature and thereupon it ignites. Upon ignition of the refuse in the combustion chamber, the gases formed thereby and also the gases formed during the burning of the supply of gas or oil in the event that an oil or gas burner is used with the incinerator, pass out through the flue 8 to a chimney (not shown) or otherwise are conducted away from the flue pipe 8. The ash which remains after combustion includes the fine carbon deposits from the refuse or rubbish that has been burned and the term "ash" is also used to include any partially burned refuse as well as any non-burnable material that remains after combustion. The ash that accumulates within the combustion chamber 5 is temporarily retained on the inclined walls 16 of the bottom section of the combustion chamber and also on the inclined walls 43 of the baffle member 44. It will be noted that even though ash is temporarily retained within the bottom section of the combustion chamber 5 and on the inclined walls of baffle member 44 and even if there is a sufficient accumulation to completely block momentarily the annular passageway 45 formed between the bottom edges of the inclined walls 16 and the inclined walls 43 of the baffle member 44, at no time will air which is necessary for combustion be blocked to the burner unit in the event that a gas or oil burner is employed. The air coming up from the bottom of the incinerator through suitable openings (not shown) in the outer casing passes around sewer pipe 25, around the water pipe 55, around the ash receiver 17 and supporting straps 21, for the ash receiver to burner 14. In the event that an electrical heater is used, of course there is no concern as to whether or not air is accessible to the heater element from the exterior of the incinerator. When it is desired to rid the combustion chamber of ash which has accumulated during combustion one may actuate valve lever 54 to send a spurt of water to spray nozzle 15 and ejection nozzle 47. Spray nozzle 15 sends out the water it receives in a fine spray over the inclined walls 16 of the lower part of the combustion chamber 5 and there mixes with the ash deposited thereon and swirls the ash in a circular path in its travel down to opening formed by the lower edges 19 of combustion chamber 5. The ash and water intimately mix and pass through passageway 45 defined by the intersection of the inclined walls 43 of the baffle member 44, with the inclined walls 16 of the lower section of the combustion chamber 5 to ash receiver 17 where they are aided in their downward travel by the inclined walls 27 of ash receiver 17. The water and ash accumulates temporarily in the bowl section of the ash receiver within the inclined walls 27 and the mixture of water and ash flows downward through the vertical flow duct 29 in the ash receiver and settles in the bottom of the ash receiver where it is met by a jet of water from ejection nozzle 47 which is more powerful than the spray nozzle and of such force that the ash particles which have passed from the combustion chamber are quickly expelled. Ejection nozzle 47 is so disposed within ash receiver 17 that it is in a direct line with the sewer pipe 25 and there are no obstructions in its path so that it presents a powerful source of water which ejects the ash coming downward from the vertical flow duct 29 and directly expels it to the sewer pipe 25 communicating with ash receiver 17. The flow of water to spray nozzle 15 and to ejection nozzle 47 can be designed to continue after initial actuation of foot lever 54 by time delay characteristics in valve 53, as heretofore explained. Valve 53 can be disposed at the junction of the piping to the ejection nozzle 47 and to spray nozzle 15 such as to operate as a two-way valve to allow for a flow of water to spray nozzle 15 for a predetermined time after actuation of the foot lever 54 and then shut off the spray nozzle while continuing the flow of water to the ejection nozzle so that the net result, as heretofore explained, would be that the spray nozzle would be receiving water for a predetermined time after the actuation of the foot lever and simultaneously the ejection nozzle would be operating to expel the ash that has accumulated in the bottom of the receiver by the operation of the spray nozzle and then after the spray nozzle ceased to function after a predetermined time and after all of the ash collected or temporarily retained by the lower section of the combustion chamber has settled within the bottom portion of the ash receiver the ejection nozzle would continue to receive an increased amount of water to expel the ash that has passed to the bottom portion of the ash receiver. The water entering into the lower part of the combustion chamber 5 is carefully prevented from accidentally meeting the heater 11 by means of diverter plate 14 and the dual function stack plate 12, which also serves to prevent any water splashing into the vicinity of the burner.

In certain instances, it may be desirable to provide a grate or a wire screen within the combustion chamber 5 above inclined walls 16 and above the path of the water traveled by the stream issuing from spray nozzle 15. This would secure that if any refuse is left in the combustion chamber 5 when foot lever 54 is actuated it would not become wet as the grate or screen would hold the refuse above the area of action of spray nozzle 15. Baffle member 44, like bottom section 7 of combustion chamber 5, is shown as a conical member, but it could take any convenient shape. Also it is to be understood that the ash removal apparatus herein described could be used in conjunction with removable ash drawers or ash chambers.

In the figures it is not shown that the ash removal apparatus and its associated parts beginning with the bottom section 7 of the combustion chamber 5 are removable, but of course the lower section of the combustion chamber could be manufactured as a separate temporary repository for ash and used with any conventional ash-producing furnace other than the incinerator shown and described. It is preferred that the lower section of the combustion chamber or the ash repository in the event that the ash removal apparatus is manufactured as a separate unit has inclined walls in order to facilitate the transfer of ash by a spray of water from the spray nozzle and likewise it is preferred that the baffle member have inverted inclined walls to match the opening of the lower section of the combustion chamber in order to define an annular passageway which would control the size of the ash passable from the combustion chamber to the ash receiver.

While it will be apparent that the preferred embodiment of the invention herein described and shown is well calculated to fulfill the objects above stated, it will be appreciated that the invention is susceptible to modification, variation and change without departing from the proper scope and fair meaning of the subjoined claims.

What is claimed is:

1. An incinerator or the like comprising a combustion chamber having a bottom section to temporarily retain ash formed during combustion, an ash receiver, a spray nozzle associated with said combustion chamber to transfer said ash from said combustion chamber to the said ash receiver, adjustable means mounted on said ash receiver and disposed between the said combustion chamber and the said ash receiver to control the size of ash passing from the said combustion chamber to the said ash receiver, and an ejection nozzle associated with said ash receiver to expel ash from the said ash receiver to the exterior of the said incinerator.

2. An incinerator or the like comprising a combustion chamber having a bottom section to temporarily retain ash formed during combustion, an ash receiver, a spray nozzle associated with said combustion chamber to transfer said ash from said combustion chamber to the said ash receiver, adjustable means mounted on said ash receiver and disposed between the said combustion chamber and the said ash receiver to control the size of ash passing from the said combustion chamber to the said ash receiver, an ejection nozzle associated with said ash receiver to expel ash from the said ash receiver to the exterior of the said incinerator, and valve means to initiate a flow of water to the said spray nozzle and to the said ejection nozzle and to terminate the said flow of water.

3. An incinerator or the like comprising a combustion chamber having a bottom section, said bottom section having walls which incline downwardly and inwardly to form an opening therein, an ash receiver disposed below the said opening and comprising a lower bowl portion and an upper bowl portion overlying said lower bowl portion, communicating means extending downwardly from said upper bowl portion into said lower bowl portion, outlet means in said lower bowl portion, the lowest extremity of said outlet means being above the level of the lowest extremity of said communicating means a spray nozzle associated with the said combustion chamber to transfer ash from the said combustion chamber to the said ash receiver, a baffle member mounted on said lower bowl portion and disposed so as to define an annular passageway with the said opening in the bottom section of the combustion chamber to control the size of ash passing from said combustion chamber to the said upper bowl portion of said ash receiver, and fluid nozzle means associated with said lower bowl portion and disposed so as to direct fluid toward said outlet means.

4. Ash removal apparatus for use with furnaces or the like comprising an ash repository temporarily to retain ash produced during combustion, an ash receiver, said ash receiver having a lower bowl portion and an upper bowl portion overlying said lower bowl portion, communicating means extending downwardly from said upper bowl portion into said lower bowl portion, outlet means in said lower bowl portion, the lowest extremity of said outlet means being above the level of the lowest extremity of said communicating means, a spray nozzle associated with said ash repository to flush said ash from the said repository to said ash receiver and through said communicating means, adjustable means mounted on said lower bowl portion between said repository and said ash receiver to control the size of ash passing from the said repository to said ash receiver, and an ejection nozzle in the lower bowl portion of said ash receiver disposed so as to direct fluid toward said outlet means.

5. A combination ash receiver and ash disposer for use in conjunction with an ash repository having means for retaining ash, which comprises a housing having a lower bowl portion and an upper bowl portion overlying said lower bowl portion, communicating means extending downwardly from said upper bowl portion into said lower bowl portion, outlet means in said lower bowl portion, the lowest extremity of said outlet means being above the lowest extremity of said communicating means, vertically adjustable means mounted on said lower bowl portion and disposed within said communicating means and extending thereabove and terminating at its upper extremity in a conical member sloping downwardly and outwardly from said upper extremity, said conical member being positioned adjacent to said ash-retaining means on said repository and adapted to shield said upper bowl portion and control the size of ash admitted thereto, and fluid nozzle means in said lower bowl portion disposed so as to discharge fluid toward said outlet means.

6. An ash receiver and ash disposer as claimed in claim 5 wherein said fluid nozzle means is disposed so that the fluid discharged therefrom passes directly toward said outlet means without engaging said vertically adjustable means.

7. An incinerator as claimed in claim 3 wherein common fluid source means is connected to said spray nozzle and fluid nozzle means, and valving means in said fluid source means enabling fluid supply to said spray nozzle prior to supply of fluid to said fluid nozzle means.

8. An incinerator as claimed in claim 3 wherein common fluid source means is connected to said spray nozzle and said fluid nozzle means, and valve means in said fluid source means enabling fluid supply to said spray nozzle means responsive to fluid pressure on said valve means and automatic valve means for enabling high-pressure fluid to reach said fluid nozzle means a predetermined time interval after fluid has been released to said spray nozzle means.

References Cited in the file of this patent

UNITED STATES PATENTS

| 76,455 | Hosford | Apr. 7, 1868 |
| 231,687 | Smith | Aug. 31, 1880 |
| 390,191 | Sahler | Sept. 25, 1888 |
| 1,866,756 | Deutsch | July 12, 1932 |
| 2,160,026 | Martin | May 30, 1939 |
| 2,280,944 | Foresman | Apr. 28, 1942 |
| 2,562,270 | Hebert | July 31, 1951 |
| 2,579,402 | Silk | Dec. 18, 1951 |
| 2,693,776 | Mylting | Nov. 9, 1954 |
| 2,725,834 | Richter-Glier | Dec. 6, 1955 |
| 2,805,425 | Musacchia | Sept. 10, 1957 |

FOREIGN PATENTS

| 340,336 | Great Britain | Jan. 1, 1931 |
| 341,033 | Great Britain | Jan. 2, 1931 |
| 9,286 | Sweden | Oct. 8, 1898 |